United States Patent [19]

Friedmann et al.

[11] Patent Number: 5,895,574

[45] Date of Patent: *Apr. 20, 1999

[54] ROLLED LIQUID FILTER USING FLUTED MEDIA

[75] Inventors: Francis A. Friedmann, South St. Paul; Gary R. Gillingham, Prior Lake; Bernard A. Matthys, Apple Valley; Daniel T. Risch, Burnsville; Wayne M. Wagner, Apple Valley; Fred H. Wahlquist, Bloomington, all of Minn.

[73] Assignee: Donaldson Company, Inc., Minneapolis, Minn.

[*] Notice: This patent issued on a continued prosecution application filed under 37 CFR 1.53(d), and is subject to the twenty year patent term provisions of 35 U.S.C. 154(a)(2).

[21] Appl. No.: 08/639,154

[22] Filed: Apr. 26, 1996

[51] Int. Cl.⁶ ........................................... B01D 27/06
[52] U.S. Cl. ........................... 210/443; 210/455; 210/456; 210/493.4; 210/497.1
[58] Field of Search ..................................... 210/439, 443, 210/444, 453, 493.4, 497.1, 232, 438, 440, 450, 456, 483, 492, 497.01, DIG. 17, 455

[56] References Cited

U.S. PATENT DOCUMENTS

| | | |
|---|---|---|
| 1,729,135 | 9/1929 | Slauson . |
| 2,038,071 | 4/1936 | Wilhelm . |
| 2,190,886 | 2/1940 | Schaaf et al. . |
| 2,210,397 | 8/1940 | Dreiss . |
| 2,322,548 | 6/1943 | Sigmund . |
| 2,397,759 | 4/1946 | Sigmund . |
| 2,599,604 | 6/1952 | Bauer et al. . |
| 2,726,184 | 12/1955 | Cox et al. . |
| 3,020,977 | 2/1962 | Huppke et al. . |
| 3,025,963 | 3/1962 | Bauer . |
| 3,025,964 | 3/1962 | Summers et al. . |
| 3,037,637 | 6/1962 | Bub . |
| 3,070,937 | 1/1963 | Bub . |
| 3,076,554 | 2/1963 | Bub . |
| 3,112,184 | 11/1963 | Hollenbach . |
| 3,112,262 | 11/1963 | Parkinson . |
| 3,279,615 | 10/1966 | Stokes . |
| 3,279,616 | 10/1966 | Bourdale . |
| 3,323,963 | 6/1967 | Summers . |
| 3,346,121 | 10/1967 | Bally . |
| 3,759,391 | 9/1973 | Dreher . |
| 3,807,150 | 4/1974 | Maracle . |
| 3,858,793 | 1/1975 | Dudrey . |
| 3,962,097 | 6/1976 | Reiman et al. . |
| 3,975,273 | 8/1976 | Shaltz et al. . |
| 4,039,457 | 8/1977 | Schacht et al. . |
| 4,065,341 | 12/1977 | Cub . |
| 4,157,902 | 6/1979 | Tokar . |
| 4,289,513 | 9/1981 | Brownhill et al. . |

(List continued on next page.)

FOREIGN PATENT DOCUMENTS

| | | | |
|---|---|---|---|
| 0 347 477 A1 | 12/1989 | European Pat. Off. . | |
| 1947527 | 4/1971 | Germany | 210/444 |
| 29764 | 7/1986 | Japan | 210/497.1 |
| 717304 | 10/1954 | United Kingdom . | |
| 764846 | 1/1957 | United Kingdom . | |
| 1 579 881 | 11/1980 | United Kingdom . | |
| 1 579 882 | 11/1980 | United Kingdom . | |
| 1 579 883 | 11/1980 | United Kingdom . | |
| WO 83/01582 | 5/1983 | WIPO . | |
| WO 88/03431 | 5/1988 | WIPO . | |
| WO 88/03432 | 5/1988 | WIPO . | |

*Primary Examiner*—Matthew O. Savage
*Attorney, Agent, or Firm*—Merchant, Gould, Smith, Edell, Welter & Schmidt, P.A.

[57] ABSTRACT

A filter apparatus includes a fluted filter element in a filter housing having a first open end and a second closed end. The filter element includes fluted filter media coiled into a cylindrical shape and may include an end cap for support and fluid control. Fluid flows into the open end and either around the filter to the closed and back through the filter element or through the filter element to the closed end and then back through a central opening in the filter element.

8 Claims, 21 Drawing Sheets

U.S. PATENT DOCUMENTS

| | | |
|---|---|---|
| 4,310,419 | 1/1982 | Nara et al. . |
| 4,410,427 | 10/1983 | Wydeven . |
| 4,439,321 | 3/1984 | Taki et al. . |
| 4,460,388 | 7/1984 | Fukami et al. . |
| 4,589,983 | 5/1986 | Wydevan . |
| 4,652,286 | 3/1987 | Kusuda et al. . |
| 4,704,863 | 11/1987 | Abthoff et al. . |
| 4,718,926 | 1/1988 | Nakamoto et al. . |
| 4,719,012 | 1/1988 | Groezinger et al. ............. 210/DIG. 17 |
| 4,824,564 | 4/1989 | Edwards et al. ......................... 210/443 |
| 4,925,561 | 5/1990 | Ishii et al. . |
| 5,015,379 | 5/1991 | Drori . |
| 5,143,575 | 9/1992 | Glassel et al. ......................... 210/232 |
| 5,174,895 | 12/1992 | Drori . |
| 5,316,676 | 5/1994 | Drori . |
| 5,322,537 | 6/1994 | Nakamura et al. . |
| 5,435,870 | 7/1995 | Takagaki et al. ..................... 210/493.4 |
| 5,512,075 | 4/1996 | Ninomiya et al. . |

ROLLED LIQUID FILTER USING FLUTED MEDIA

BACKGROUND OF THE INVENTION

1. Field of the Invention

The present invention relates to a filter apparatus, and in particular, to a liquid filter apparatus having fluted filter media.

2. Description of the Prior Art

Filters which are used for filtering gases or liquids are well known and are commonly utilized for many types of filtering applications. Although prior filter devices are able to satisfactorily filter a substantial portion of the particulate and other materials from the fluids, still further improvements are possible. Filter density has become more critical as greater performance is required, while minimizing weight, volume and cost. A longer filter service interval without loss of efficiency has also gained importance.

A common problem with filter designs is inadequate filter surface area. For liquid filters, such as fuel filters, water, oil or coolant filters, the effective filtering surface area for a given volume of filter has not been entirely satisfactory. Pleated filters are commonly used which utilize a pleated filter media. A common liquid filter design which utilizes pleated filter media with radially inward flow is shown in FIGS. 1 and 2. Such filters utilize a pleated filter cartridge which typically mounts in a metal spin-on canister. Although this type of filter does remove a substantial amount of particulate and other matter, it has several disadvantages. A large portion of the internal volume of the filter is wasted space which is not utilized for filtration. The wasted space is due to the manner in which the filter media is pleated and positioned around a perforated central core. The hollow central core is needed to support the filter media and to allow an area for filtered fluid to collect and be directed out of the filter element after passing through the filter media.

Another problem with the pleated filter design is that the nature of pleated filters provides an upper limit as to the amount of filter media which may be positioned around the central core. The smaller the inner diameter of the filter and the center core, the more difficult it becomes to package the media in this manner. The number of pleats becomes too great and the pleats touch at an inner portion. This configuration limits the amount of filter media that can be put in a given volume, thereby causing uneven loading of contaminants on only some portions of the filter media and increasing the pressure drop across the filter. As today's automobiles require longer service intervals, pleated filters are often unable to operate over the extended interval without sacrificing efficiency. In addition, even though the pleats are spaced very tightly at their inner diameter, the pleats are very widely spaced at their outer diameter, as shown in FIG. 2. The gaps are required with the nature of the prior art design and require large space which cannot be used for filter media.

Another drawback to the pleated filter design is that with wide gaps between pleats, it is difficult for the pleats to maintain their positions so that as the filter loads with contaminants, the pleats may shift or bunch. This may cause pressure drop across the filter to increase and may result in failure of the filter. To overcome this problem, filters of this type often have to utilize hot melt beads, wraps of string, or other materials to help maintain the widely spaced pleats in position. However, these measures increase the complexity, weight and costs of such filters.

In addition to the drawbacks of the filtering efficiencies and volume required, conventional fluid filters are relatively complex and require a high number of parts, adding to the component and manufacturing costs. Problems associated with manufacturing include the steps of pleating the filter media prior to positioning around the center core, packing into a cylindrical shape, and forming a seal where the pleats connect. In addition, the center core must provide substantial support to the pleated filter media to withstand the pressure differential which tends to collapse the filters when loading with contaminant. To add additional support, the ends of the filter media generally must be potted with a plastisol material and inserted into metal end caps. Other supports may be placed around the outer diameter of the pleats such as hot-melt beads, wrapping strings or outer liners. A spring is typically utilized in the bottom of a spin-on canister to hold the filter cartridge tightly against an upper seal at the opening to prevent contaminated fluids from bypassing the filter.

It can be seen then that a new and improved liquid filtering apparatus is needed. In particular, the filtering apparatus should be structurally self-supporting to reduce support required for the filter media. In addition, such an apparatus should provide increased filter media for a given volume, thereby decreasing the pressure drop across the filter and the total volume required for the filter. Such a filter should also provide for flexibility in the flow path through the filter element within a canister and decrease the central area within the filter media. Such a device should also reduce the total number of parts and manufacturing complexity of a filter. The present invention addresses these as well as other problems associated with liquid filters.

SUMMARY OF THE INVENTION

The present invention is directed to a filter apparatus, and in particular to a liquid filter apparatus. The filter apparatus includes a substantially cylindrical housing which is open at one end, having a fluted filter media element retained therein. The fluted filter utilizes a fluted filter layer rolled into a substantially cylindrical filter element. In a first embodiment, fluid flows into the exterior of the open end along the interior of the filter housing to the closed end and then backward through the fluted filter element to an interior outlet at the open end. In a second embodiment, the fluid enters the exterior annular inlet at the open end, flows through the fluted filter element to the closed end and then flows through a center tube to the outlet at the open end.

These features of novelty and various other advantages which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

In the drawings, wherein like reference letters and numerals indicate corresponding elements throughout the several views.

DETAILED DESCRIPTION OF THE PREFERRED EMBODIMENT

Figure 1:
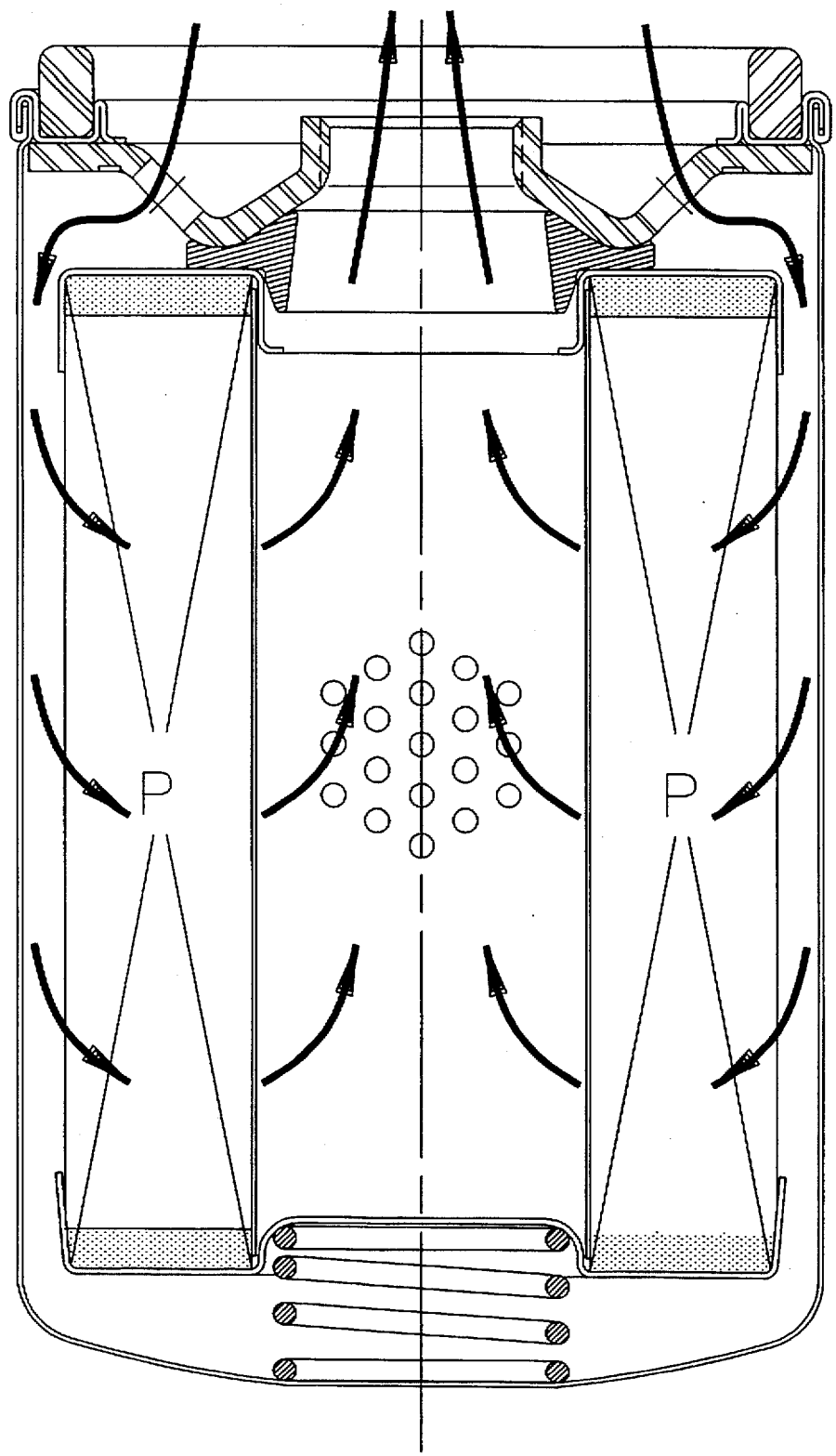
FIG. 1 shows a side sectional view of a prior art pleated fluid filter.
Figure 2:
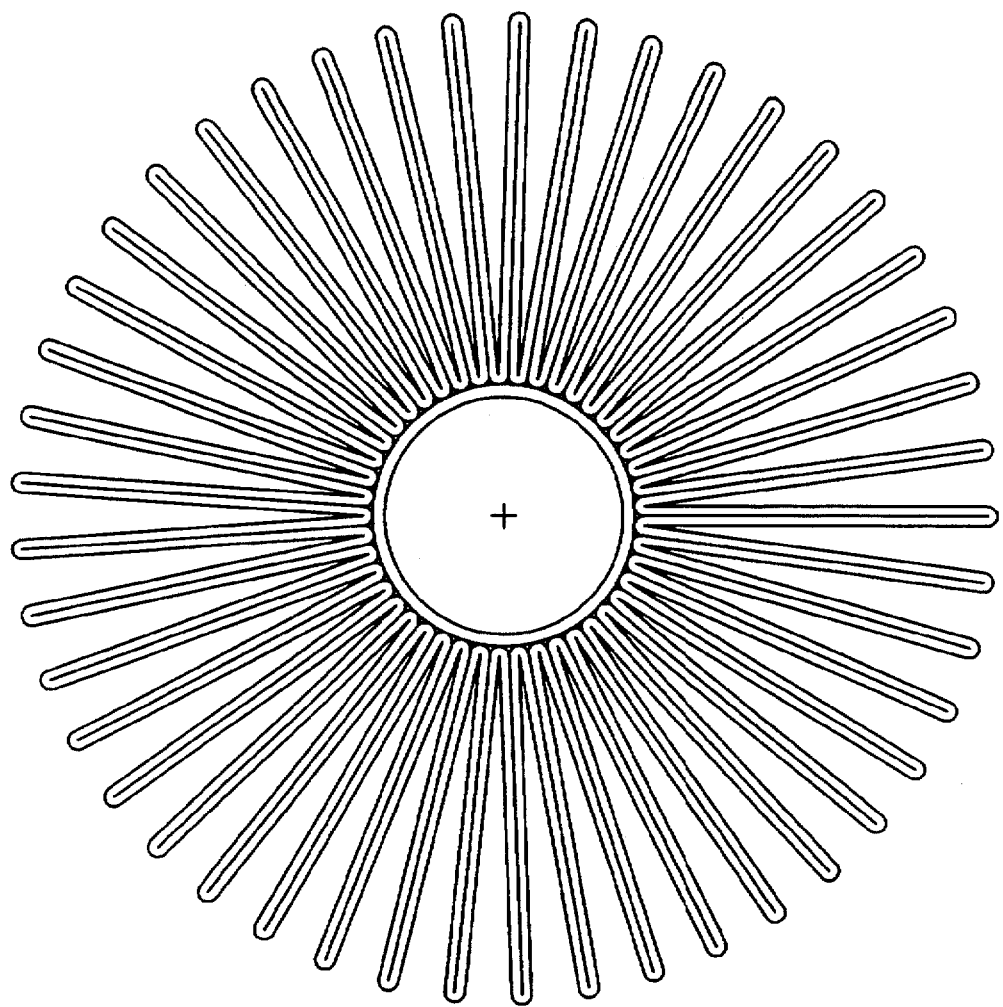
FIG. 2 shows an end view of pleated filter media for the prior art filter shown in FIG. 1.
Figure 3:
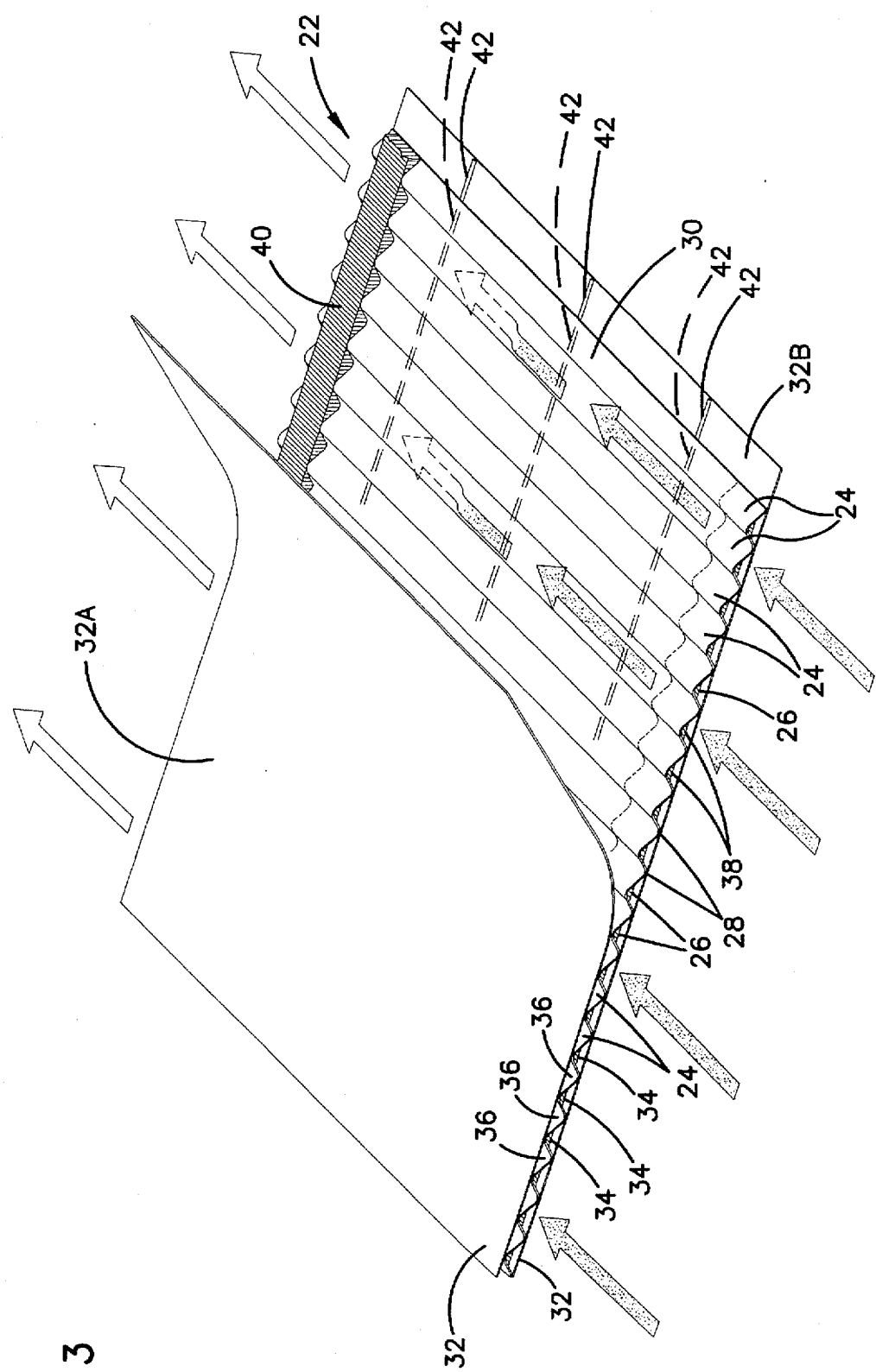
FIG. 3 shows a perspective view of fluted filter media according to the principles of the present invention.

Referring now to the drawings, and in particular to FIG. 3, there is shown a portion of a layer of permeable fluted filter media, generally designated 22. The fluted filter media 22 includes a multiplicity of flutes 24 which form a modified corrugated-type material. The flute chambers 24 are formed by a center fluting sheet 30 forming alternating peaks 26 and troughs 28 mounted between facing sheets 32, including a first facing sheet 32A and a second facing sheet 32B. The troughs 28 and peaks 26 divide the flutes into an upper row and lower row. In the configuration shown in FIG. 3, the upper flutes form flute chambers 36 closed at the downstream end, while upstream closed end flutes 34 are the lower row of flute chambers. The fluted chambers 34 are closed by first end bead 38 filling a portion of the upstream end of the flute between the fluting sheet 30 and the second facing sheet 32B. Similarly, a second end bead 40 closes the downstream end 36 of alternating flutes 24. Adhesive tacks 42 connect the peaks 26 and troughs 28 of the flutes 24 to the facing sheets 32A and 32B. In a preferred embodiment, the tacks 42 are placed only at the apex of the peaks 26 and troughs 28 to minimize the adhesive used and to maximize the open portions of the flute chambers 34 and 36. The flutes 24 and end beads 38 and 40 provide a filter element 22 which is structurally self-supporting without a housing.

During use, unfiltered fluid enters the flute chambers 36 which have their upstream ends open as indicated by the shaded arrows. Upon entering the flute chambers 36, the unfiltered fluid flow is closed off by the second end bead 40. Therefore, the fluid is forced to proceed through the fluting sheet 30 or face sheets 32. As the unfiltered fluid passes through the fluting sheet 30 or face sheets 32, the fluid is filtered as indicated by the unshaded arrow. The fluid is then free to pass through the flute chambers 34, which have their upstream end closed and to flow through the open downstream end out the filter media 22. With the configuration shown, the unfiltered fluid can filter through the fluted sheet 30, the upper facing sheet 32A or lower facing sheet 32B, and into a flute chamber 34 blocked on its upstream side.

Figure 4A:
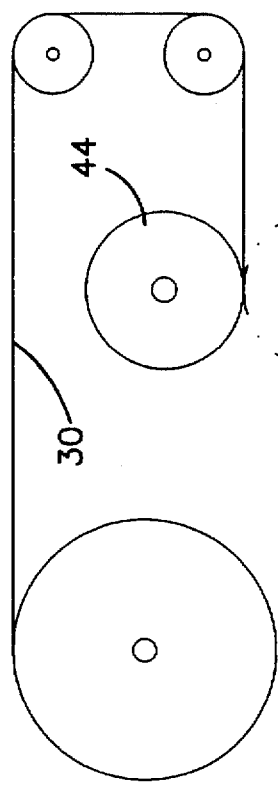
FIGS. 4A–4B show diagrammatic views of the process of manufacturing the filter media shown in FIG. 3.
Figure 4B:
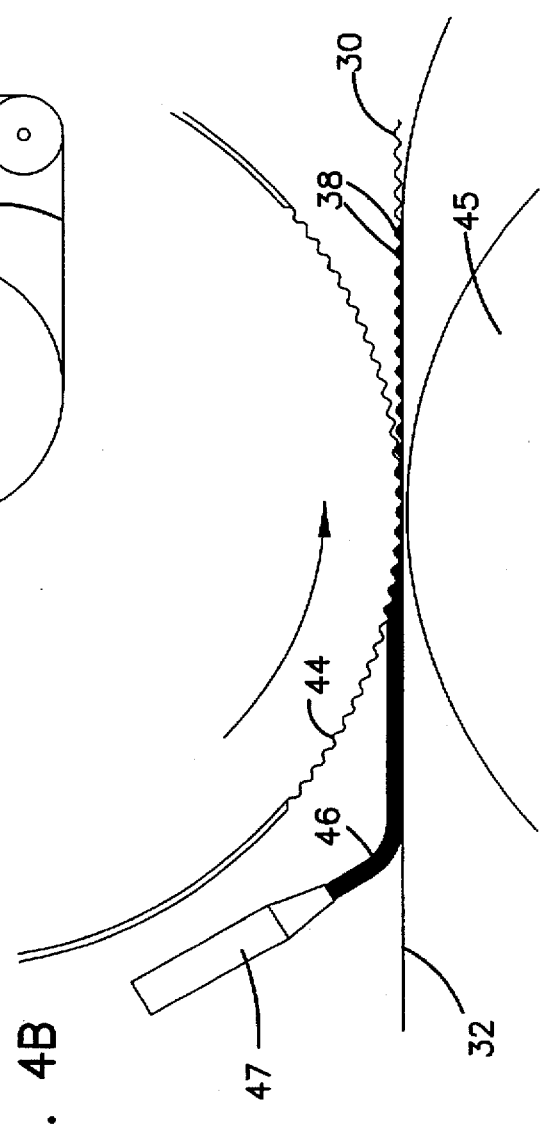

Referring now to FIGS. 4A–4B, the manufacturing process for fluted filter media which may be rolled to form filter elements, as explained hereinafter, is shown. It can be appreciated that when the filter media is spiraled, with adjacent layers contacting one another, only one facing sheet 32 is required as it can serve as the top for one fluted layer and the bottom sheet for another fluted layer. Therefore, it can be appreciated that the fluted sheet 30 need be applied to only one facing sheet 32.

Figure 6:
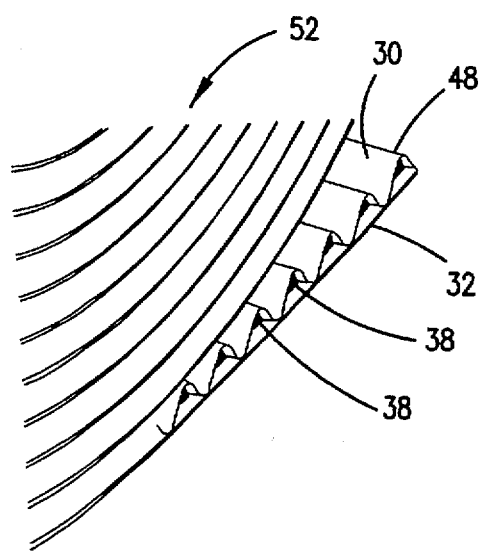
FIG. 6 shows a detail perspective view of a portion of the spiraled fluted filter media for the filter element shown in FIG. 5.

As shown in FIG. 4A, a first filtering media sheet is delivered from a series of rollers to a crimping roller 44 forming a nip with a second opposed crimping roller 44. In a similar manner, a second sheet 32 is fed to the rollers 44 and 45. A sealant applicator 47 applies a sealant 46 along the upper surface of the second sheet 32 prior to engagement between the crimping roller 44 and the opposed roller 45. As shown in FIG. 4B, the first sheet 30 engages the corrugated surface of the roller 44, and as it is pressed between the opposed crimping roller 44, takes on a corrugated or fluted configuration matching that of the corrugated rollers 44. The troughs 28 have a sealant applied at their apex or are otherwise bonded to the facing sheet 32 to form flute chambers 34. The sealant 46 forms first end bead 38 between the fluted sheet 30 and the facing sheet 32. The resultant structure of the facing sheet 32 sealed at one edge to the fluted sheet 30 is the layerable filter media 48, shown in FIG. 6.

Figure 5:
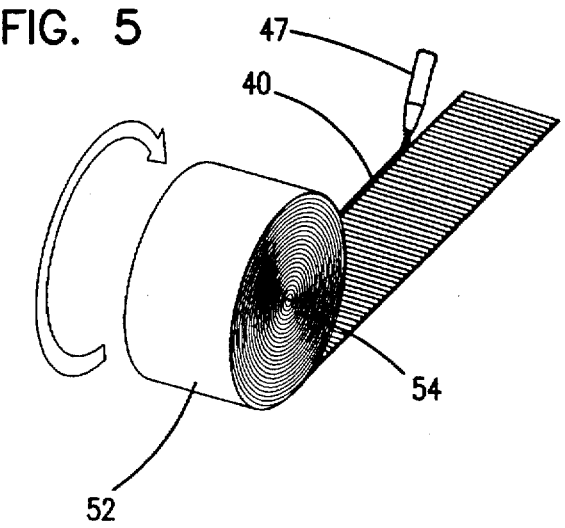
FIG. 5 shows a perspective view of the fluted filter media shown in FIG. 3 spiraled in a cylindrical configuration according to the principles of the present invention.
Figure 7:
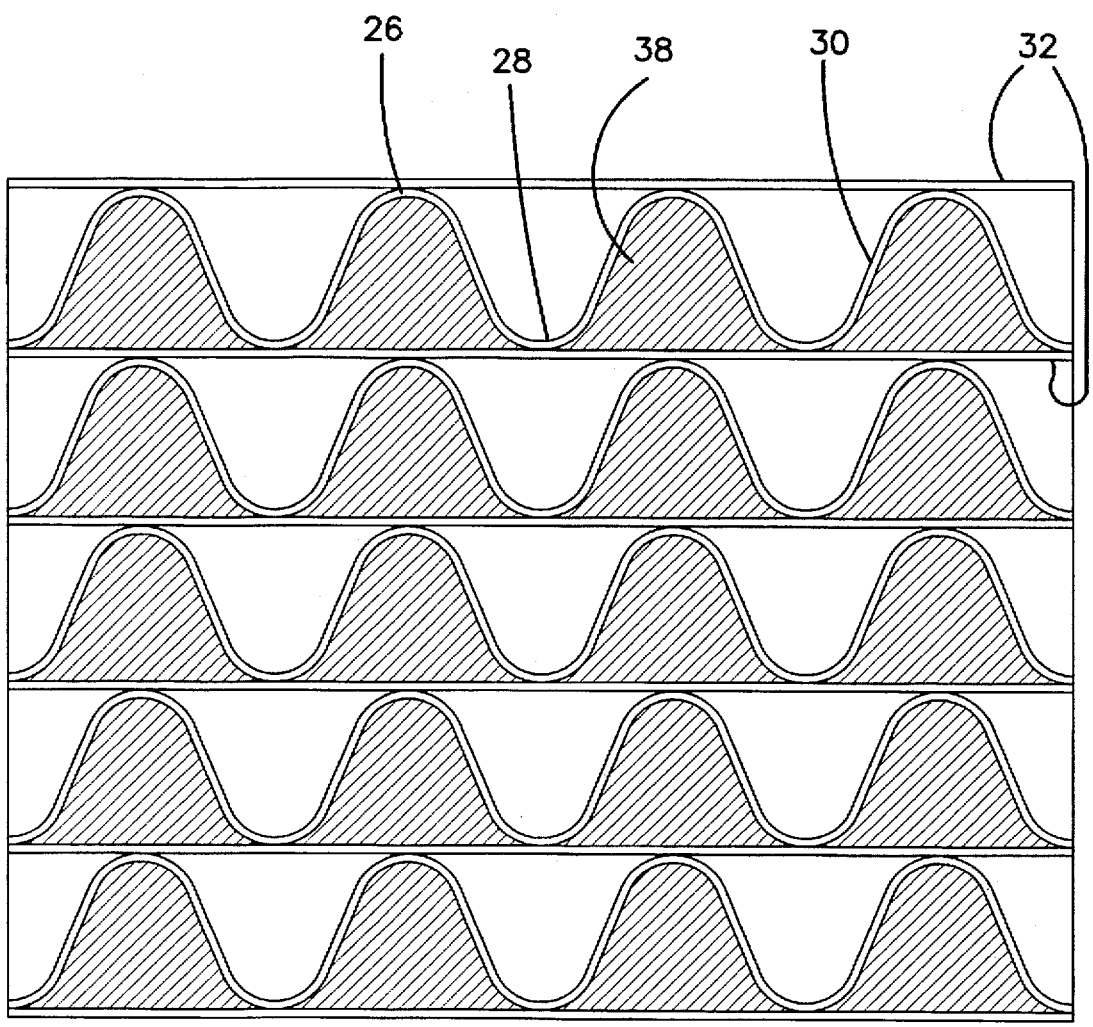
FIG. 7 shows an end elevational view of the fluted filter media shown in FIG. 3.

When forming a filter, a filter media spiral is formed, as shown in FIG. 5. It can be appreciated that the filter media layer 48 having a single backing sheet 32 and a single end bead 38 shown in FIG. 6 can be wound to form a spiral-type cylindrical filter element, generally designated 52, shown in FIG. 5 and shown in greater detail in FIGS. 6 and 7. To form the spiral filter element 52, a bead of sealant is applied lengthwise on a mandrel 54, tube or end of a length of material. An end of the single sided fluted filter media 48 is secured to the mandrel 54 via the bead of sealant. The single sided fluted filter media 48 is then rolled onto the mandrel as a second end bead 40 along a second edge of the filter media is applied with a sealant applicator to the fluted side of the single sided fluted filter media 48. As the fluted filter media 22 is rolled onto the mandrel, the second end bead 40 adheres to the first facing sheet 32 of the single sided fluted filter media, as shown in FIG. 5. It can be appreciated that when the filter media is wound, with adjacent layers contacting and sealing peaks and troughs of flutes, only one facing sheet is required as it serves as the top layer for one flute and the bottom layer for another flute. Therefore, as the second end bead 40 adheres to the first facing sheet 32, the downstream closed end flute 36 for the filter media spiral 52 is formed. When the required length of single side fluted filter media 48 is rolled onto the mandrel such that the diameter of the filter media spiral 52 is as required, an outer sealing bead is applied to the free end of the single sided fluted filter media 48. The free end of the pleated filter media is then secured to the facing sheet 32 such that the free end adheres to the filter media spiral 52. In a preferred embodiment, the adhesive tacks 42 are applied only at the apex of the peaks and troughs and are applied at the same time as the corresponding beads 38 and 40.

The filter media is configured so that when filtering, dirty fluid, as indicated by the shaded arrows, enters the upstream open ended flute chambers 36 which have their upstream ends open. After entering the upstream open ended flute chambers 36, the unfiltered fluid engages the second end bead 40. Therefore, the fluid is forced to proceed through the fluting sheet 30. As the unfiltered fluid passes through the fluting sheet 30, the fluid is filtered as indicated by the unshaded arrow. The fluid is then free to pass through the downstream open end flute chambers 34, which have their upstream end closed, and out the filter media 48. In addition, the unfiltered fluid can filter through the facing sheet 32 to the chambers 34.

Figure 8:
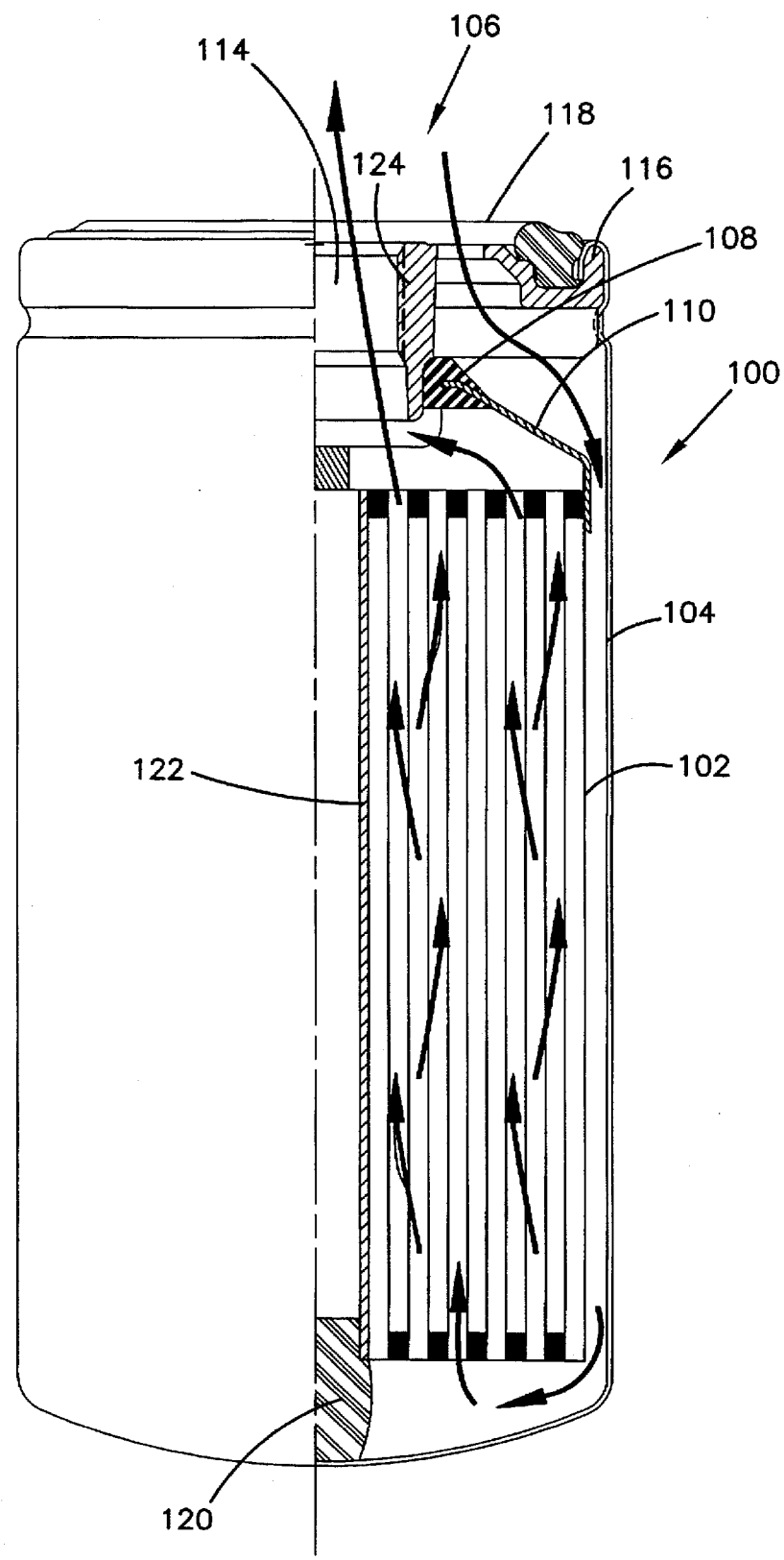
FIG. 8 shows a side sectional view of a first embodiment of a filter apparatus according to the principles of the present invention.

Referring now to FIG. 8, there is shown a first embodiment of a filter apparatus, generally designated 100. In the embodiment shown, the filter apparatus 100 is configured for use as a liquid filter and is a spin-on filter mounting onto a fitting for a circulating fluid system such as use as a diesel fuel filter or an engine oil filter. The filter includes a pleated, rolled filter element 102 inside a filter housing 104. The fluid enters an open end 106, flows axially through the filter element 102 and then exits the open end 106. The rolled filter element 102 has an end cap 110 mounted thereon and a gasket 108 forming a seal between the end cap and the annular center divider segment 124 of a mounting element 116. A gasket 118 forms a seal between the mounting element 116 and a mounting fixture. The end cap 110 may include cross braces, as explained below, which provide additional support to the end of the filter element 102. A center plug 120 is at the closed end of the housing 104 to block the center portion of the filter element 102 and may also provide a biasing force between the filter element 102 and the housing 104 to aid in positioning the filter element 102. In the embodiment shown, the filter element 102 includes a center tube 122 around which it is wound. However, it can be appreciated that the center tube 122 could be a solid member or the tube may be eliminated so that liquid flows on the periphery of the filter element and then reverses to flow from the closed end and through the filter element 102.

As shown, fluid enters the open end 106 in the annular opening of the mounting member 116 between the gasket 118 and the center annular divider segment 124. The unfiltered fluid then flows on the exterior of the end cap 110 along the inner wall of the housing 104 to the closed end of the housing 104. Fluid then flows through the open ends of the flutes in the filter element 102, passing through the fluted filter media to exit the flutes having open ends proximate the housing open end 106. The fluid then flows on the interior of the end cap 110 through the center opening 114 on the interior of the annular center divider segment 124 of the mounting member 116.

Figure 9:
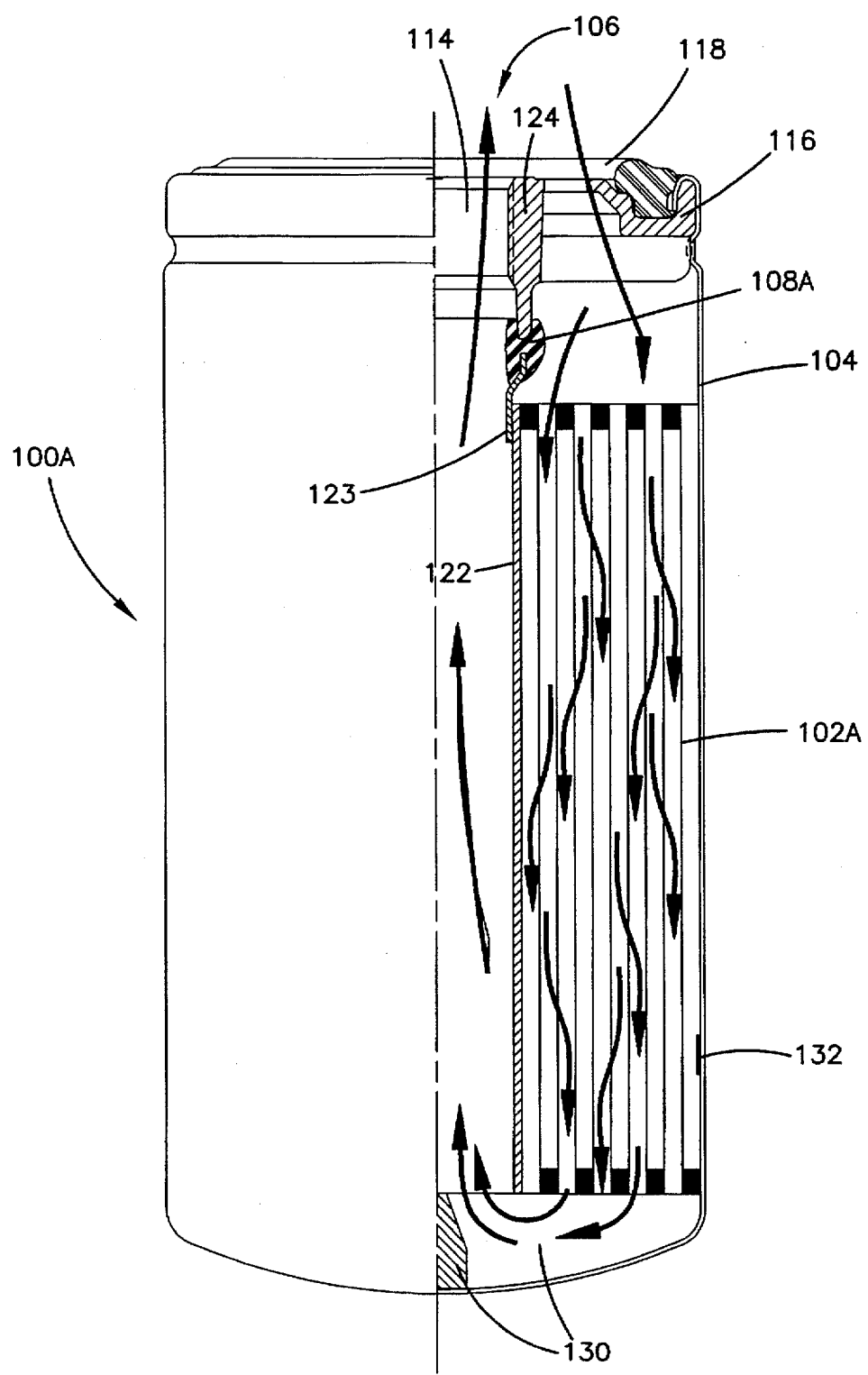
FIG. 9 shows a side sectional view of a second embodiment of a filter apparatus according to the principles of the present invention.

Referring now to FIG. 9, there is shown an alternate embodiment of the filter apparatus, generally designated 100A. The filter apparatus 100A also includes a filter element 102A and a housing 104. However, the interior configuration is different from the embodiment shown in FIG. 8 to obtain a flow pattern wherein liquid flows from the open end 106 axially through the filter element 102 to the closed end of the housing 104 and then upward through the center tube 122 exiting the open end 106 on the interior of the center divider segment 124 through the center outlet 114. The filter apparatus 100A includes the mounting member 116 and the gasket 118 forming a seal between the mounting member 116 and a fitting. The filter apparatus 100A does not require an end cap proximate the open end as flow directly enters the flutes of the filter element 102A proximate the open end 106. A gasket 108A inserts intermediate the center tube 122 which has an extension 123 extending upward therefrom that engages the center divider segment 124. In this manner, fluid enters intermediate the gasket 118 and the center divider segment 124. After passing downward, as shown in FIG. 9, to the filter element 102A, the liquid passes through the filter media and exits flutes at the closed end of the filter housing 104. Cross brace 130 provides support at the closed end to the filter element 102A. The filtered liquid then passes through the interior of the center tube 122 and exits the center of the annular divider segment 124.

Figure 10:
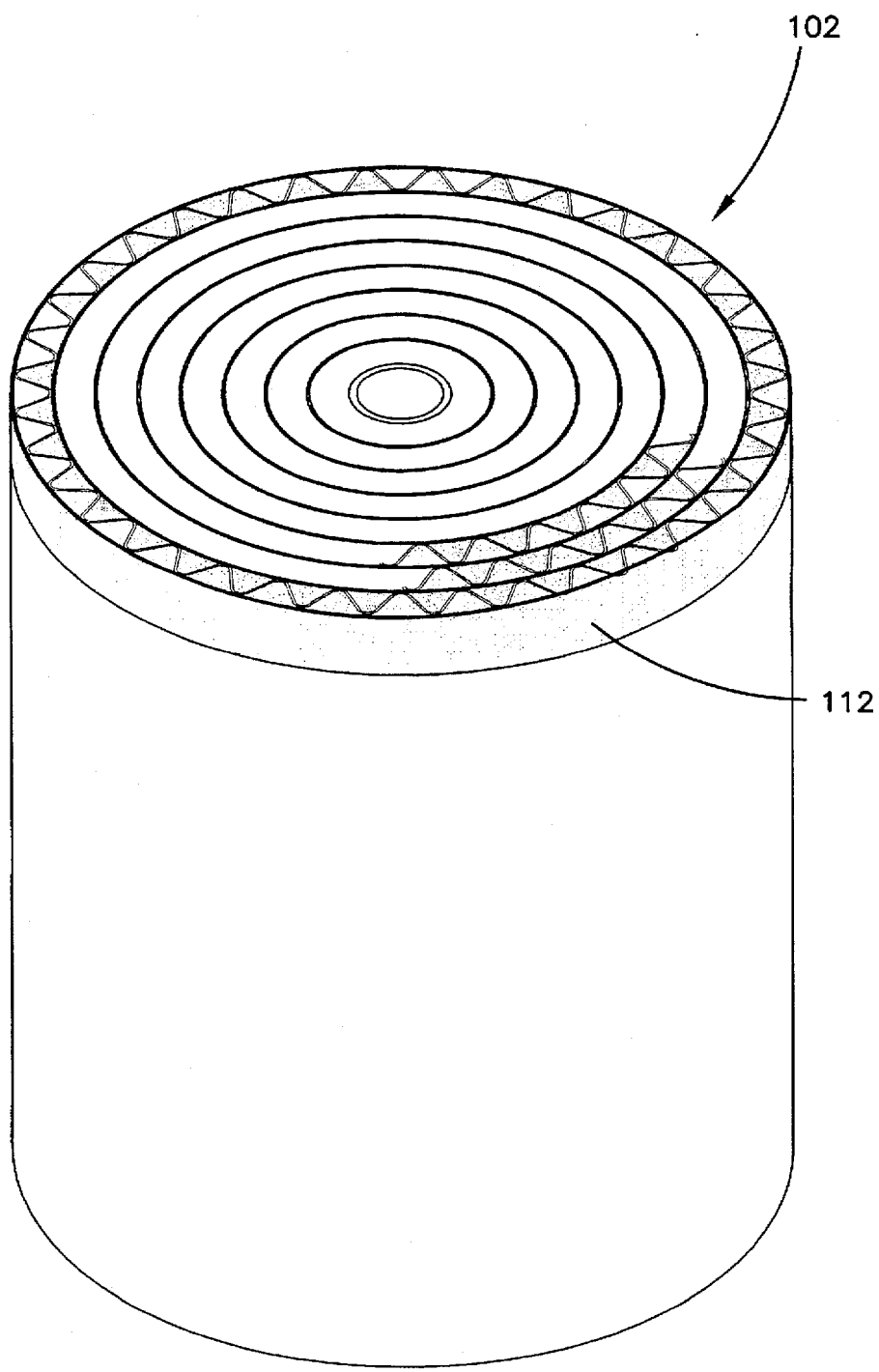
FIG. 10 shows a perspective view of a pleated filter element with an impregnated end portion.

Referring now to FIG. 10, there is shown a fluted filter element 102 having a bonding material 112 applied to one end of the element. The filter element 102 is impregnated with bonding material 112 at one end to strengthen and bond the individual flutes. The bonded end of the filter element 102 adds support to the filter media to resist rupturing under high pressure. In addition, the bonding prevents the coiled filter element 102 from telescoping.

Figure 11:
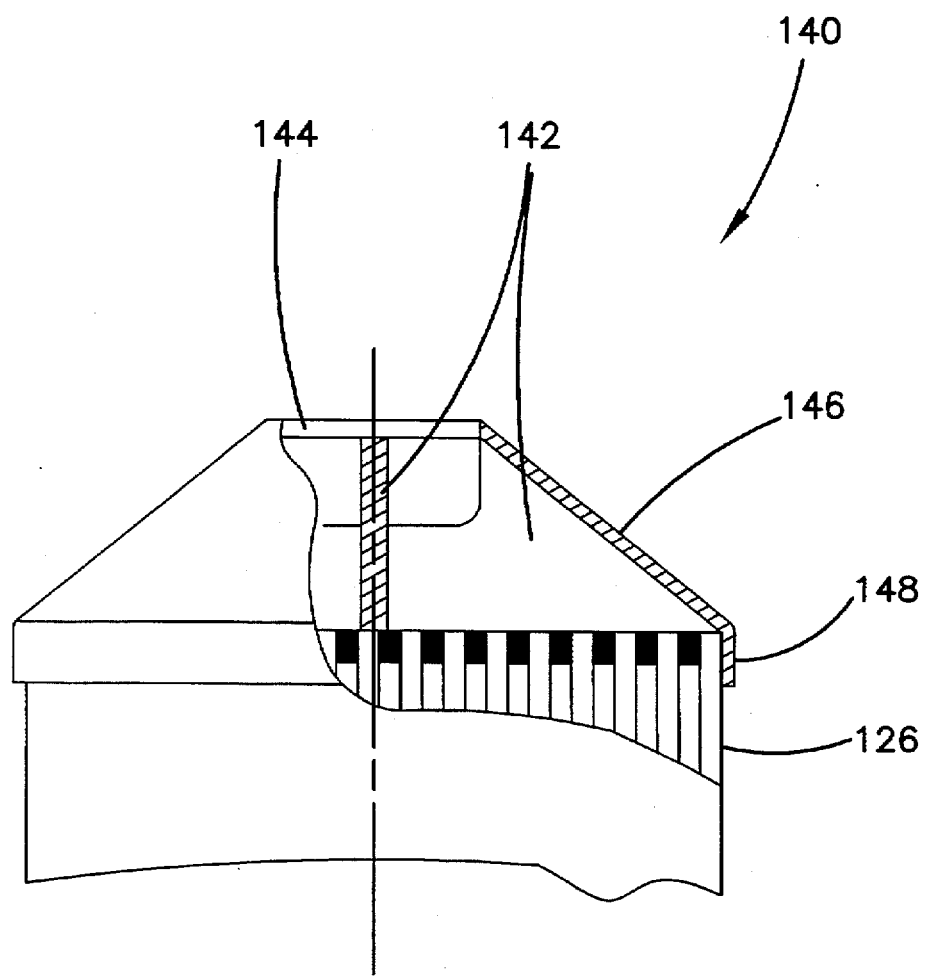
FIG. 11 shows a side partial sectional view of an end of a filter having an end cap with cross braces.
Figure 12:
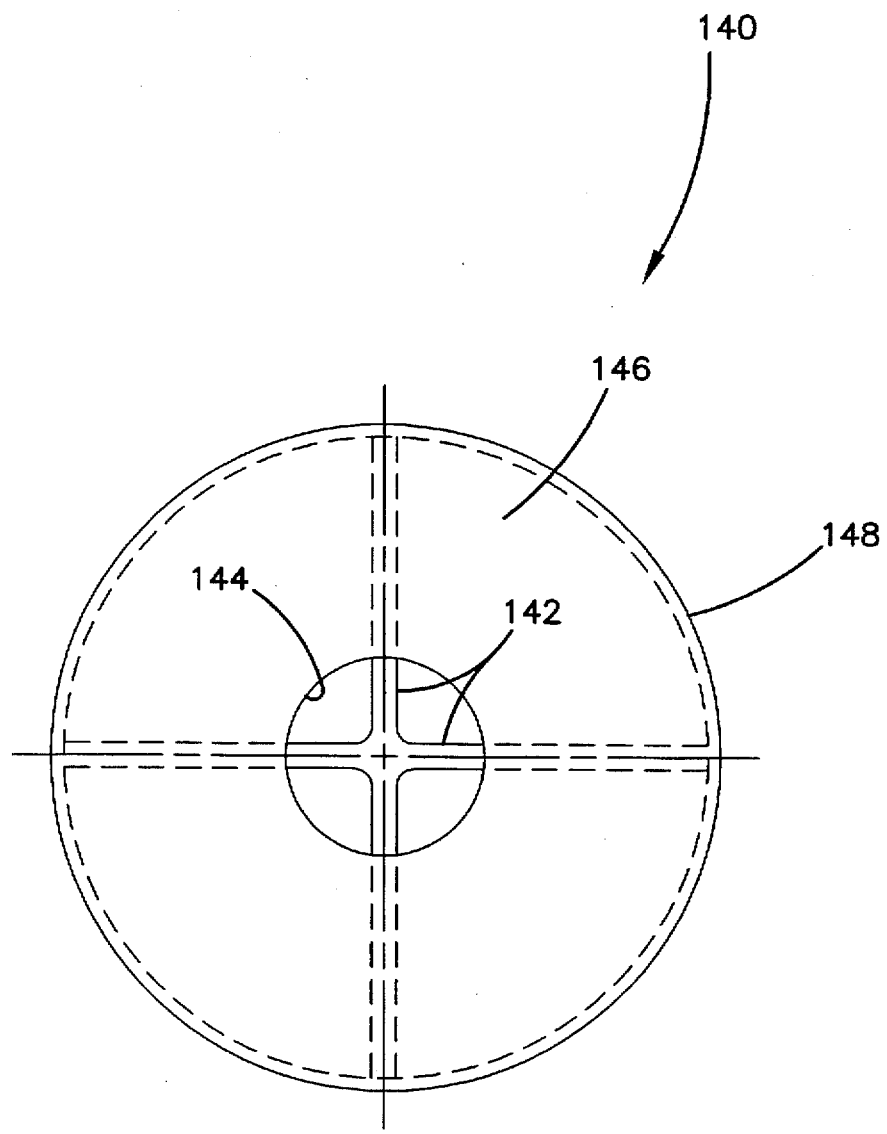
FIG. 12 shows a top plan view of the end cap shown in FIG. 11.

Referring now to FIGS. 11 and 12, there is shown a second embodiment of an end cap 140 and filter element 126 for use with the filter 100 shown in FIG. 8. The end cap 140 includes cross braces 142 supporting an angled annular portion 146. The annular portion 146 includes a center orifice 144. An exterior flange 148 is configured to fit over the exterior of the filter element 126. The end cap 140 provides flow direction for the liquid as well as support for the filter element 126 to prevent telescoping or collapsing.

The filter element 126 is similar to the filter element 102, shown in FIG. 8. However, the filter element 126 does not have a center open tube. Rather, the filter element 126 is coiled about the end of the filter media. Flow passes along the periphery of the filter element 126 and then through the filter media. In flow configurations wherein a center tube is not required, either of the filter elements 102 or 126 may be utilized. This configuration also eliminates the need for a center plug with the filter element 102. Prior pleated designs required a center perforated tube for flow to the interior of the filter element and to provide support to the element. However, pleated filter elements 102 and 126 utilize flutes which provide support so that a supportive center tube is not required.

Figure 13:
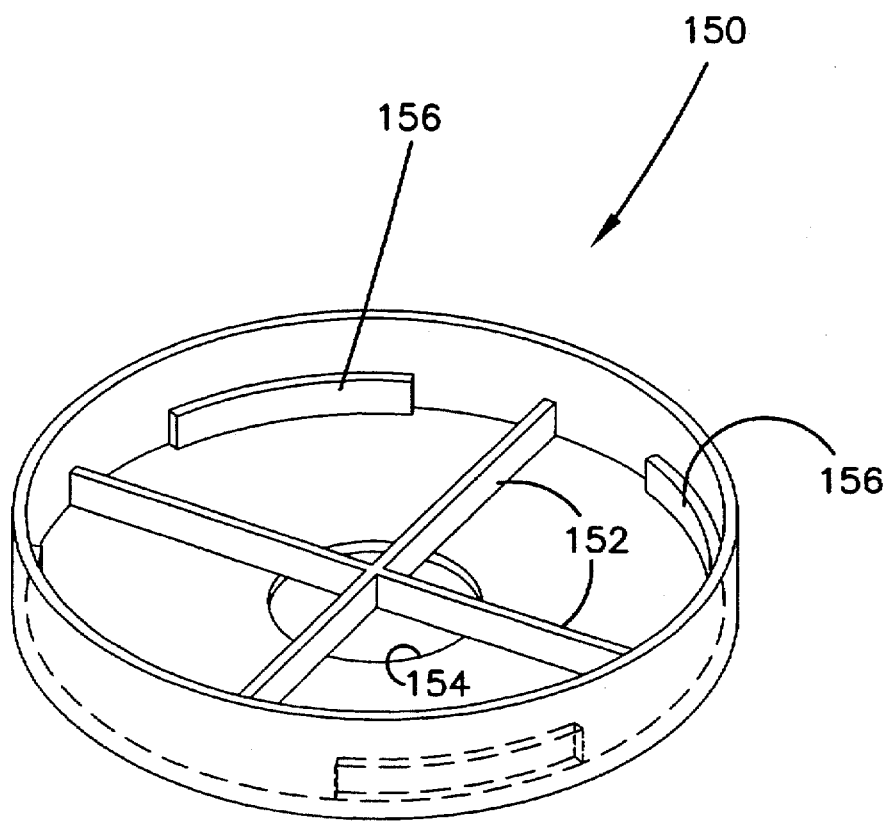
FIG. 13 shows a perspective view of a second embodiment of an end cap.
Figure 14:
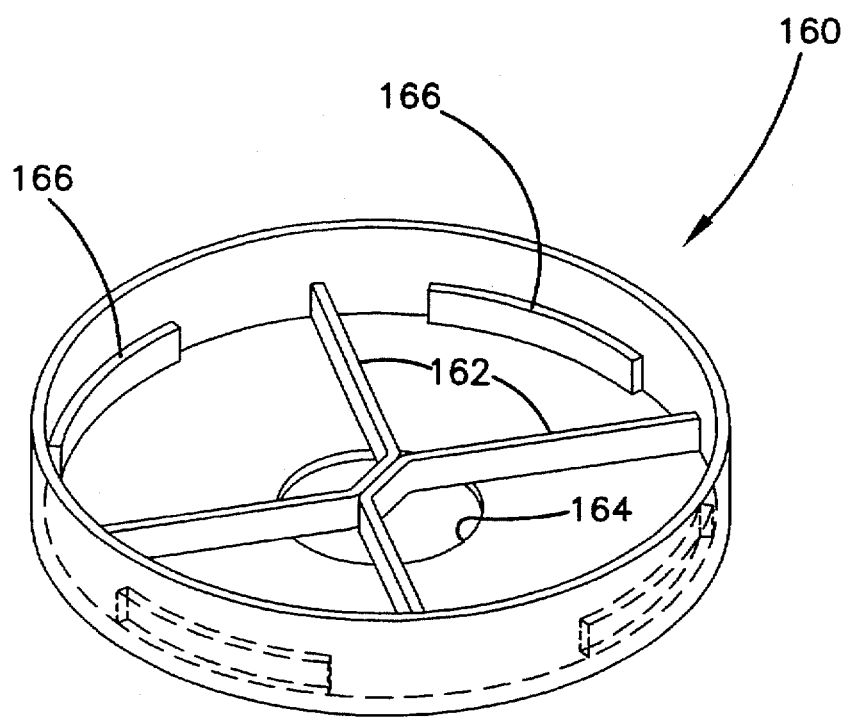
FIG. 14 shows a perspective view of a third embodiment of an end cap.

Referring to FIGS. 13 and 14, there is shown additional alternate embodiments of end caps, generally designated 150 and 160 respectively. The end cap 150 includes cross braces 152 supporting the cap 150 with an orifice 154 formed in the center thereof. In addition, reinforcing blocks 156 are positioned at the interior wall of the cap 150. Similarly, the end cap 160 includes cross braces 162 having abutting center portions providing additional support and an orifice 164 formed in the center of the end cap 160. Reinforcing portions 166 provide additional support to the walls and base of the end cap 160.

Figure 15:
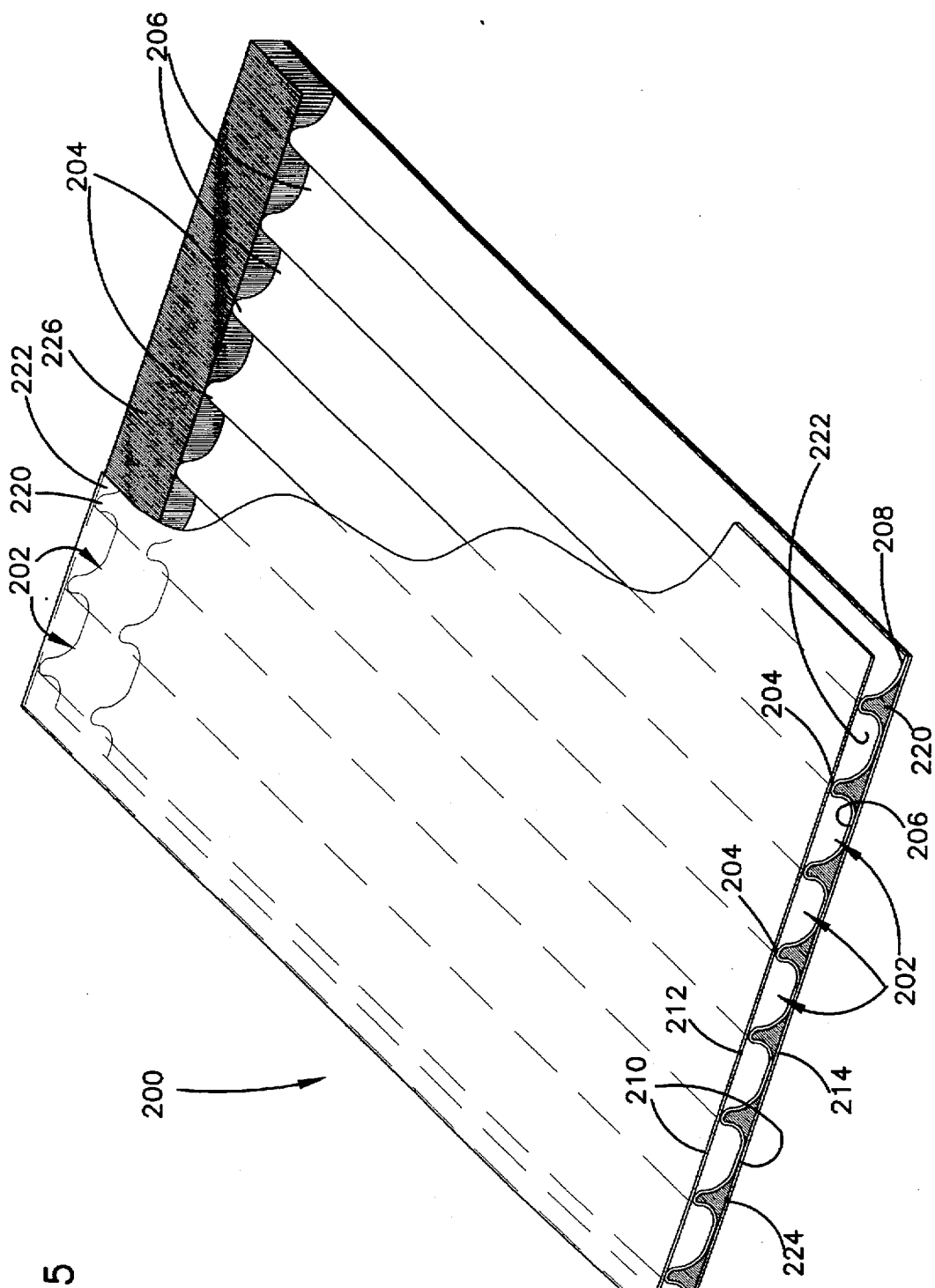
FIG. 15 shows a perspective view of a second embodiment of fluted filter media used in the rolled filter elements shown in FIGS. 8 and 9.

Referring now to FIG. 15, there is shown a second embodiment of fluted filter media, generally designated 200, having asymmetric flutes according to the principles of the present invention. The filter media 200 includes asymmetric flutes 202 forming substantially narrower peaks 204 and widened arcing troughs 206. The radius of the arc of the peaks 204 is less than the radius of the arc of the troughs 206 of the asymmetric flutes 202. The filter media 200 includes a center sheet 208 and facing sheets 210, including a first upper facing sheet 212 and a second lower facing sheet 214.

The facing sheets 210 are connected by upstream beads 224 and downstream beads 226. In this manner, the sheets 208, 212 and 214 form chambers 220 having their upstream ends closed and chambers 222 having their downstream ends closed.

It can be appreciated that with the configuration shown in FIG. 15, the upstream portion of the filter media 200 intercepting flow includes an enlarged opening for the chambers 222. In this manner, increased flow is intercepted by the fluted chambers 222 which then flow through the sheets 208, 212 and 214 and through the chambers 220. In addition, the asymmetric fluted filter media 200 provides for a self-supporting filter structure.

Figure 16:
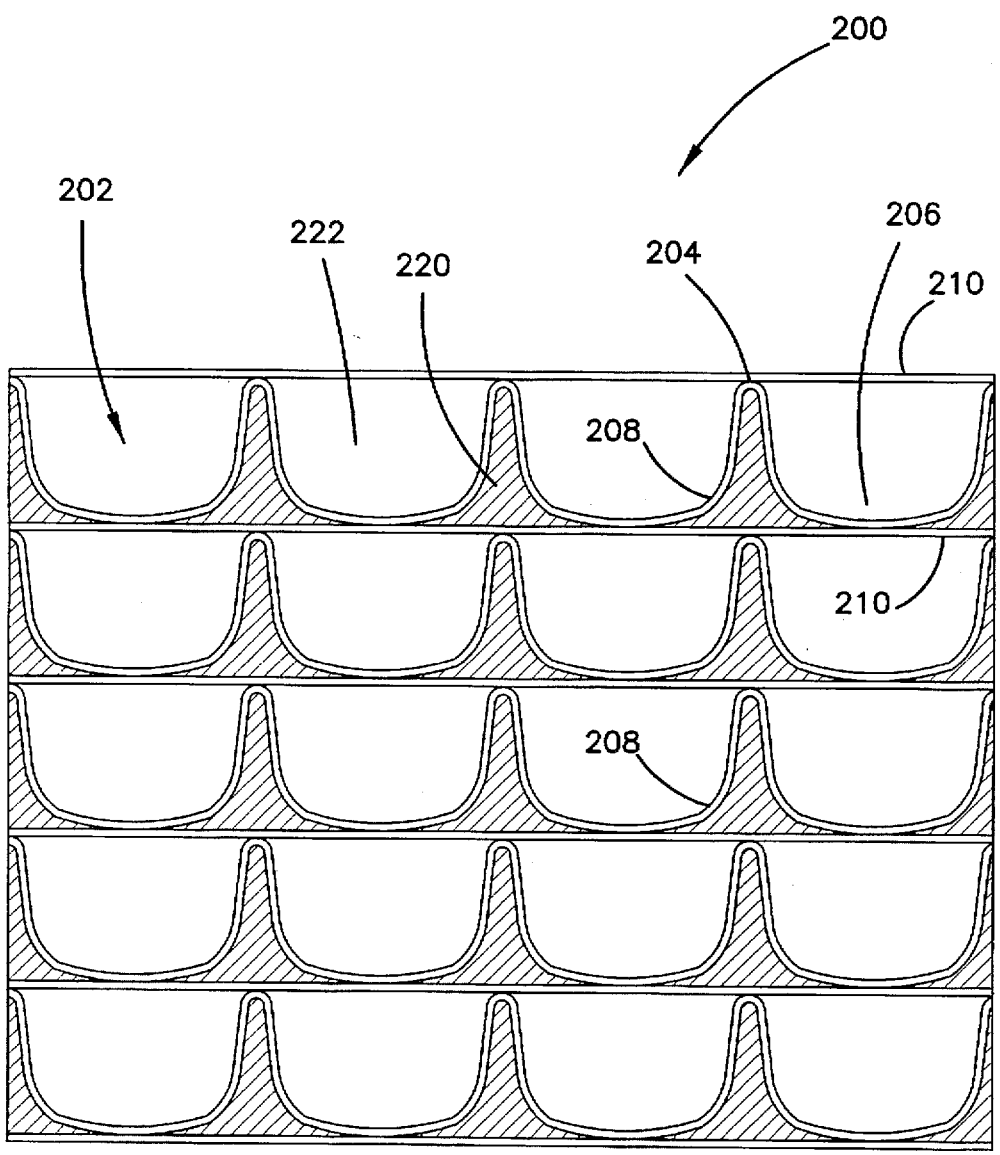
FIG. 16 shows an end elevation view of the filter media shown in FIG. 15.

Referring now to FIG. 16, the open end of the chambers 222 is substantially larger than the bead 224 at the upstream end and the surface area transverse to the flow of the sheets 208, 212 and 214. This flute arrangement decreases the restriction at the filter inlet and provides for improved flow and contaminant loading capacity. In addition, the flute configuration provides added support to the flutes to prevent collapse of the flutes under high pressure and resist filter media rupture.

Figure 21:
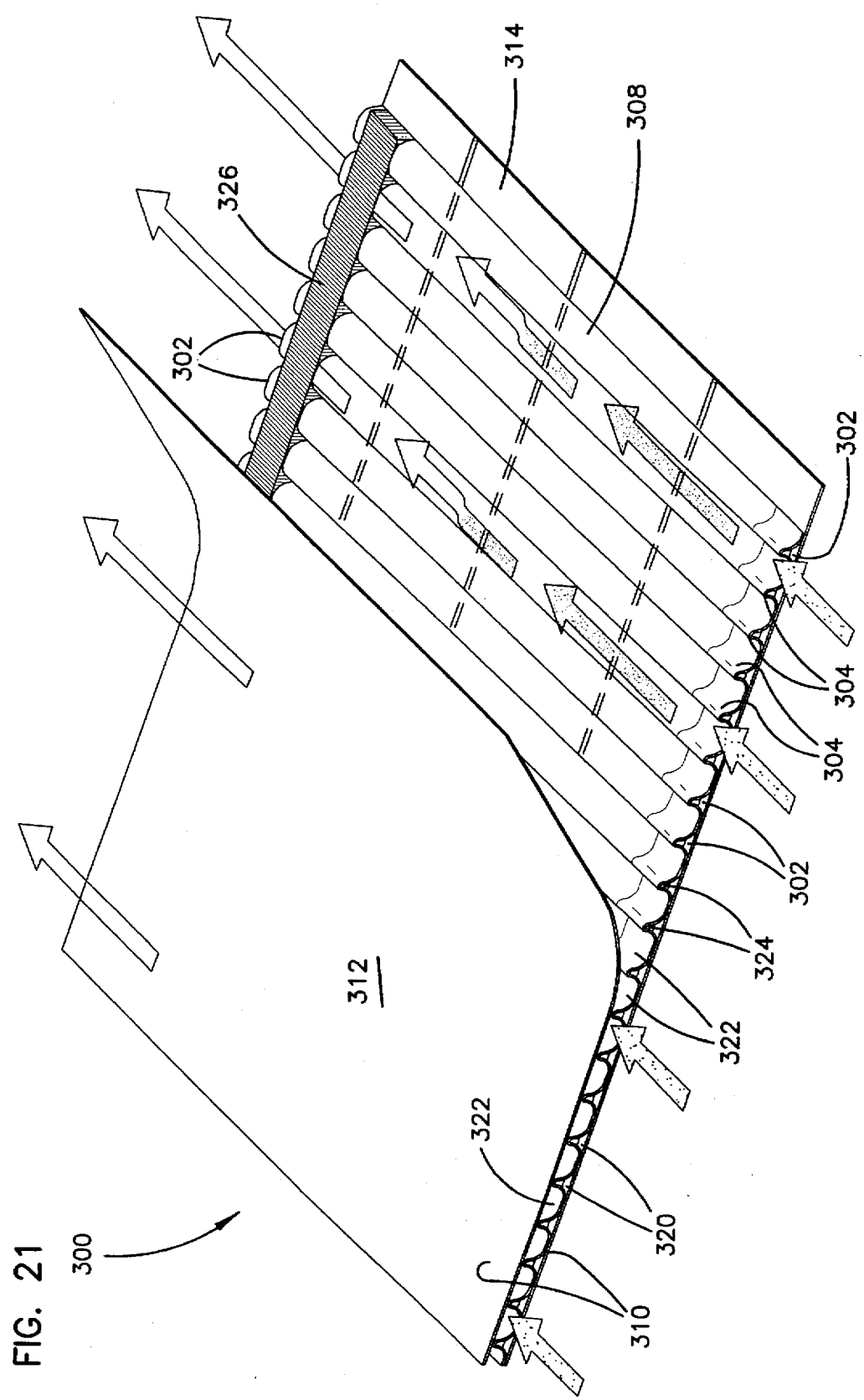
FIG. 21 shows a perspective view of fluted filter media having tapered flutes according to the principles of the present invention; and, FIG. 22 shows an end elevational view of the filter media shown in FIG. 21.

Referring now to FIG. 21, there is shown a layer of an alternate fluted filter media, generally designated 300, which may also be utilized with filter element 102. The fluted filter media 300 includes a multiplicity of tapered flute chambers 302. The flute chambers 302 are formed of a center fluting sheet 308 forming alternating peaks 304 and troughs 306 between facing sheets 310, including a first facing sheet 312 and a second facing sheet 314. However, the media 300 can be coiled so that the same sheet serves as the first facing sheet for one layer of flutes and the second facing sheet of an adjacent layer. The troughs 306 and peaks 304 divide the flutes 302 into an upper row and a lower row. In the configuration shown in FIG. 21, the upper flutes form flute chambers 322 closed at the downstream end, while upstream closed end flute chambers 320 are the lower row of flute chambers. The fluted chambers 320 are closed by first end bead 324 completely filling a section of the upstream end of the flute between the center fluting sheet 308 and the second facing sheet 314. Similarly, a second end bead 326 closes the downstream end of alternating flutes 302. Adhesive tacks at their apex connect the peaks 304 and troughs 306 of the flutes 302 to the facing sheets 312 and 314. The flutes 302 and end beads 324 and 326 provide a filter element which is structurally self-supporting without a housing.

Figure 22:
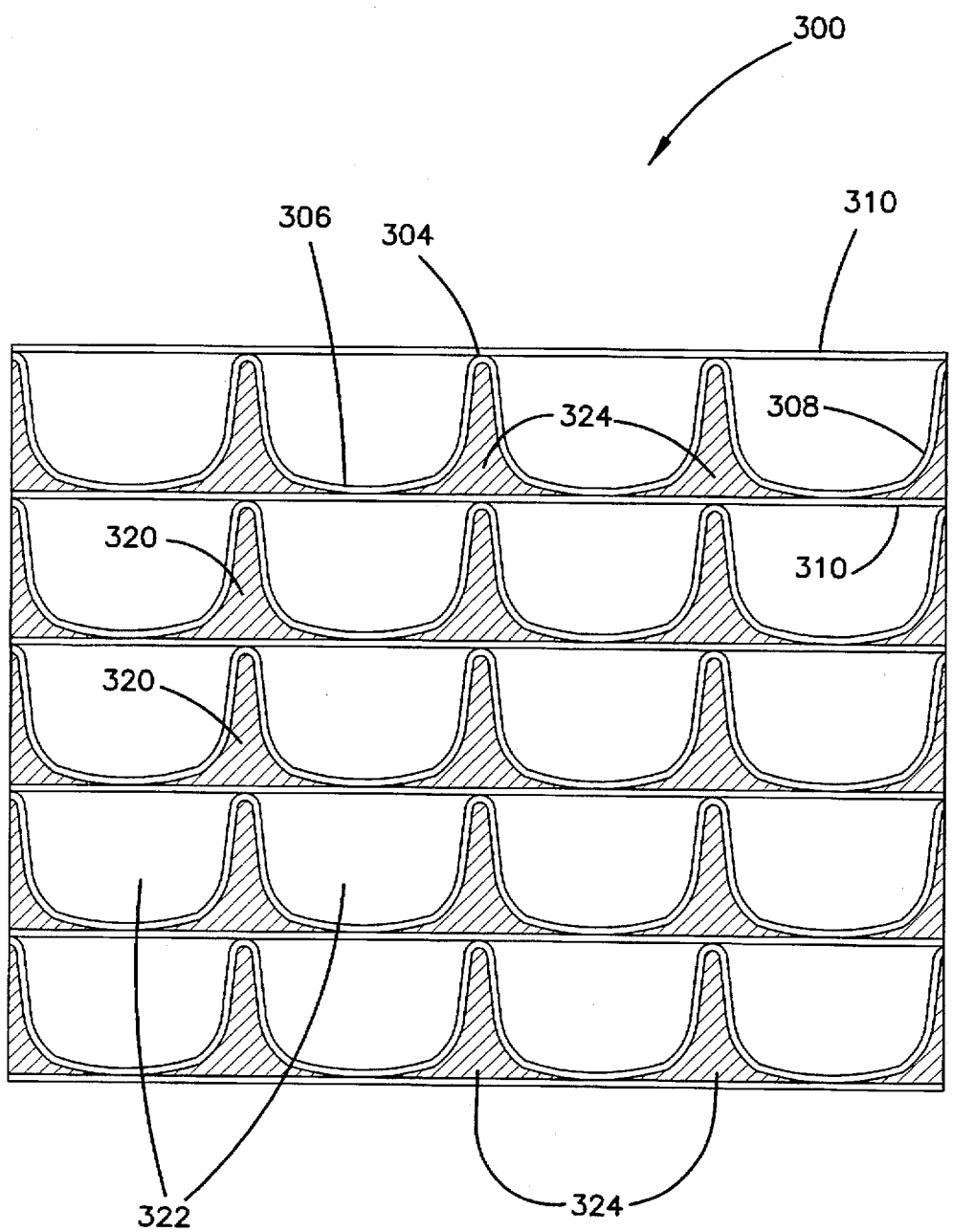

It can be appreciated that the flutes 302 taper along their length. The flute chambers 320 having their upstream end closed, widen along the trough to an enlarged downstream opening, as shown in FIG. 21. Similarly, chambers 322 have a large upstream opening, as shown in FIGS. 21 and 22, and taper to a narrowed closed end. In this manner, the portion of the filter media intercepting the upstream flow that is open is substantially increased. In addition, as the fluid flows along the flutes and passes through the walls of the filter media 302, either center sheet 308 or facing sheets 312 and 314, the fluid will flow out an enlarged open end on the downstream side of the filter.

The filter media 300 has tapered flute chambers 320 which have a closed upstream end and flute chambers 322 which have an open upstream end. It can be appreciated that with tapered flutes 302, flute chambers 322 have a larger cross sectional area transverse to the flow than the cross sectional area of the closed chambers 322 and the edges of the sheets 308, 312 and 314. In this manner, the filter media 300 intercepts greater flow with less resistance. As the flute chambers 320 and 322 taper inversely to one another, the end of the chambers are reversed in size at the downstream edge. With this configuration, it can be appreciated that the flute chambers 320 have a much smaller cross section at the closed downstream end of the filter media 300 and the flute chambers 322 have a much larger open cross sectional area at the downstream end. Therefore, the flow passes in through the larger openings of chambers 320 and out through the larger openings at the downstream ends of the flute chambers 322. With this configuration, flow passes through filter media 300 having much greater open space with less resistance, while still providing sufficient filter media area in the same volume.

Figure 17:
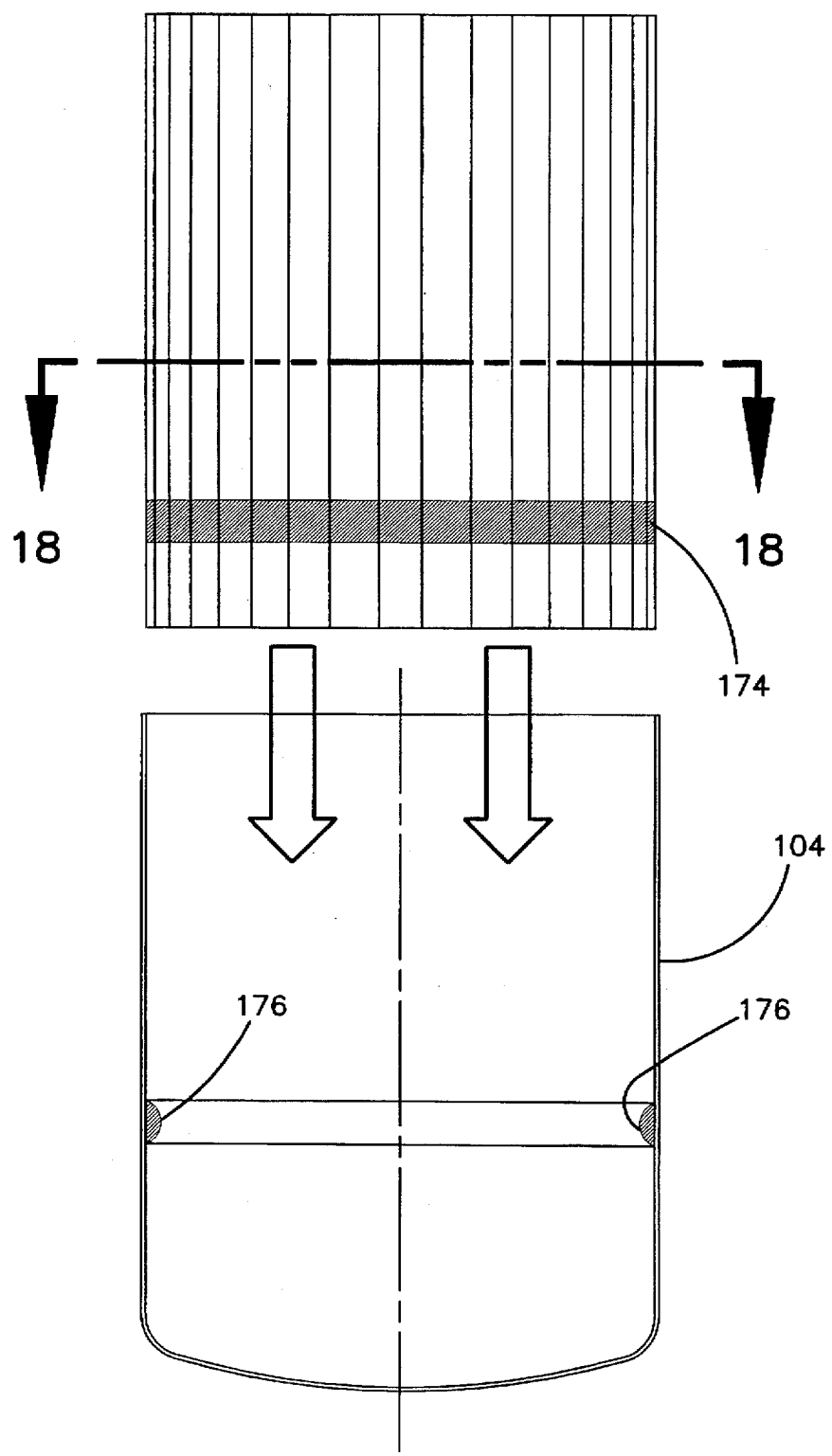
FIG. 17 shows a side elevational view of a filter having a bead of sealant applied to the exterior of the filter element.

Referring now to FIG. 17, there is shown a sealing bead arrangement for the filter apparatus 100A shown in FIG. 9. In the arrangement shown, a filter element 170 shown in FIG. 18 has flutes 172 extending radially outward from the backing layer. A gasket or bead 174 extends around the periphery of the filter element 170. The filter housing 104 may also have a bead 176 applied to the interior for engaging the gasket for providing a better seal around the exterior element 170 to the interior of filter housing 104.

Figure 18:
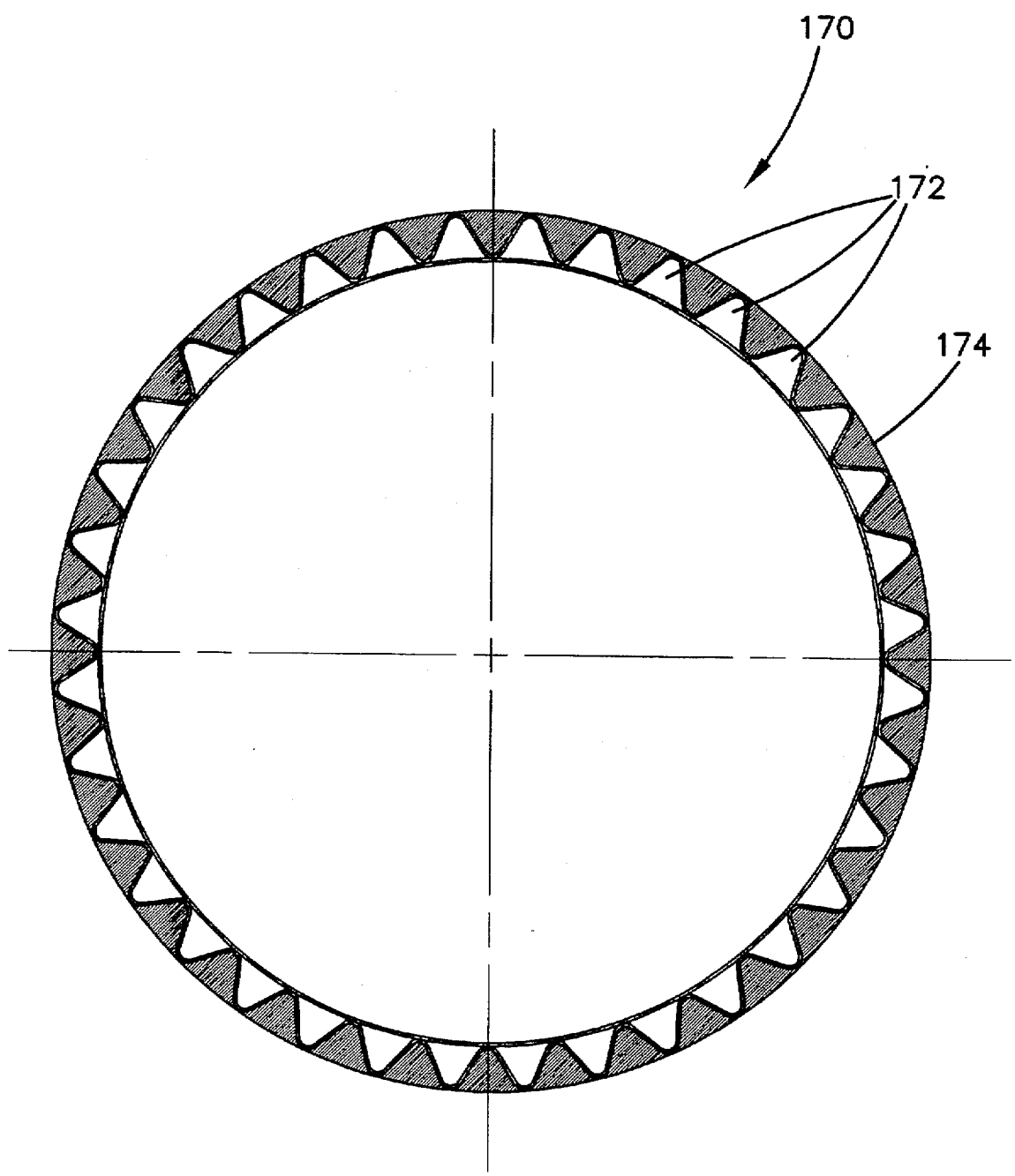
FIG. 18 shows a sectional view of the filter media taken along line 18—18 in FIG. 17.

As shown in FIG. 18, the sealant bead 174 provides a substantially circular profile for the filter element 170, rather than having spaces intermediate the flutes 172. The profile provides an improved seal against the interior of the housing 104.

Figure 19:
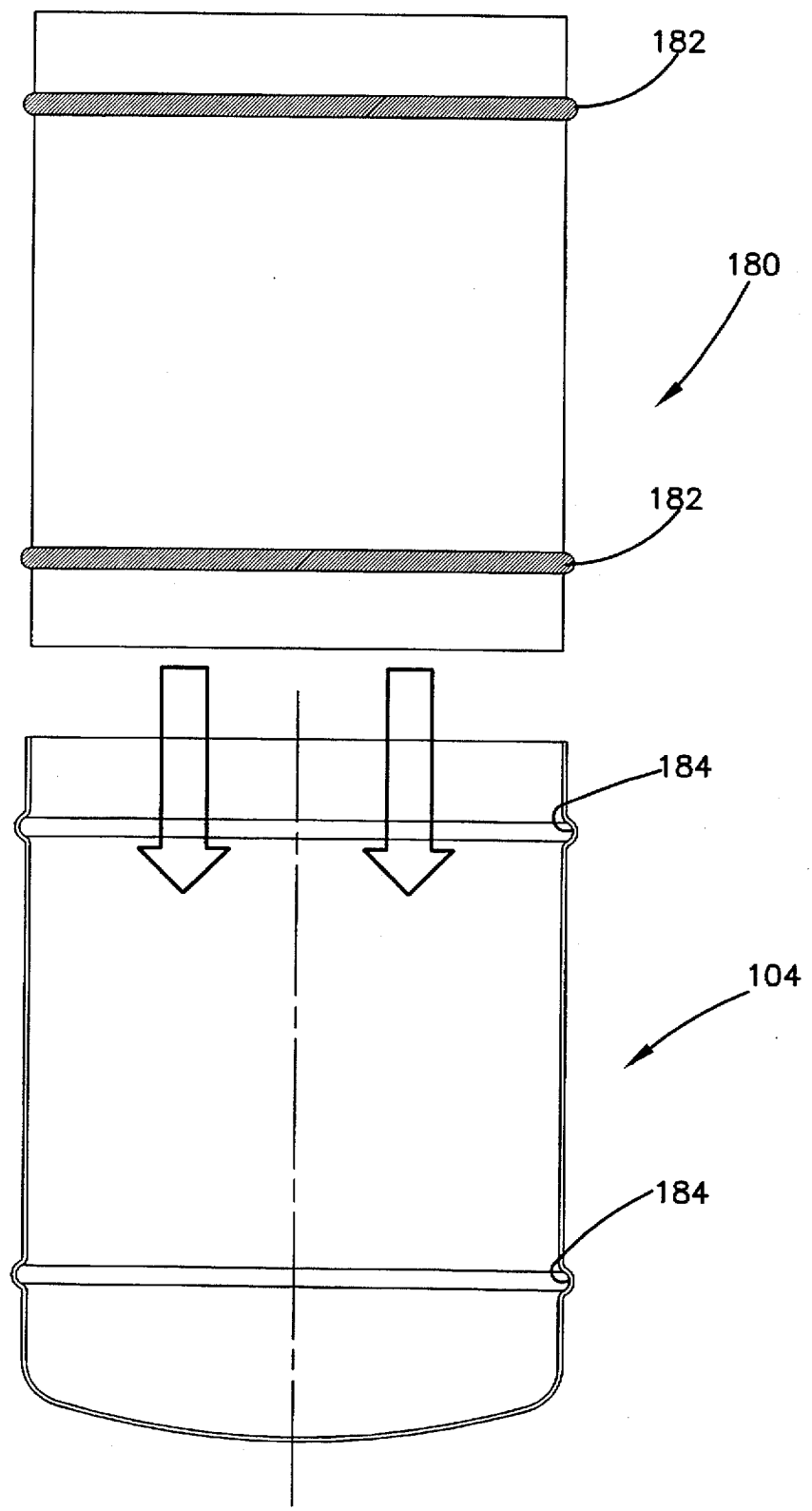
FIG. 19 shows a side elevational view of a filter apparatus according to the present invention having gaskets on the exterior of the filter element and corresponding beads formed in the filter housing according to the present invention.

Referring now to FIG. 19, there is shown a filter element 180 having the flutes extending radially inward so that the exterior of the filter element 180 includes a substantially circular profile with the backing sheet to the outside of the filter element. In the embodiment shown, a pair of gaskets or sealant beads 182 are applied at spaced intervals along the periphery of the filter element 180. In addition, the filter housing 104 includes formed radially outward extending recesses 184 corresponding to the spacing of the gaskets 182. In this manner, the gaskets seat properly and position the filter element 180 within the filter housing 104.

Figure 20:
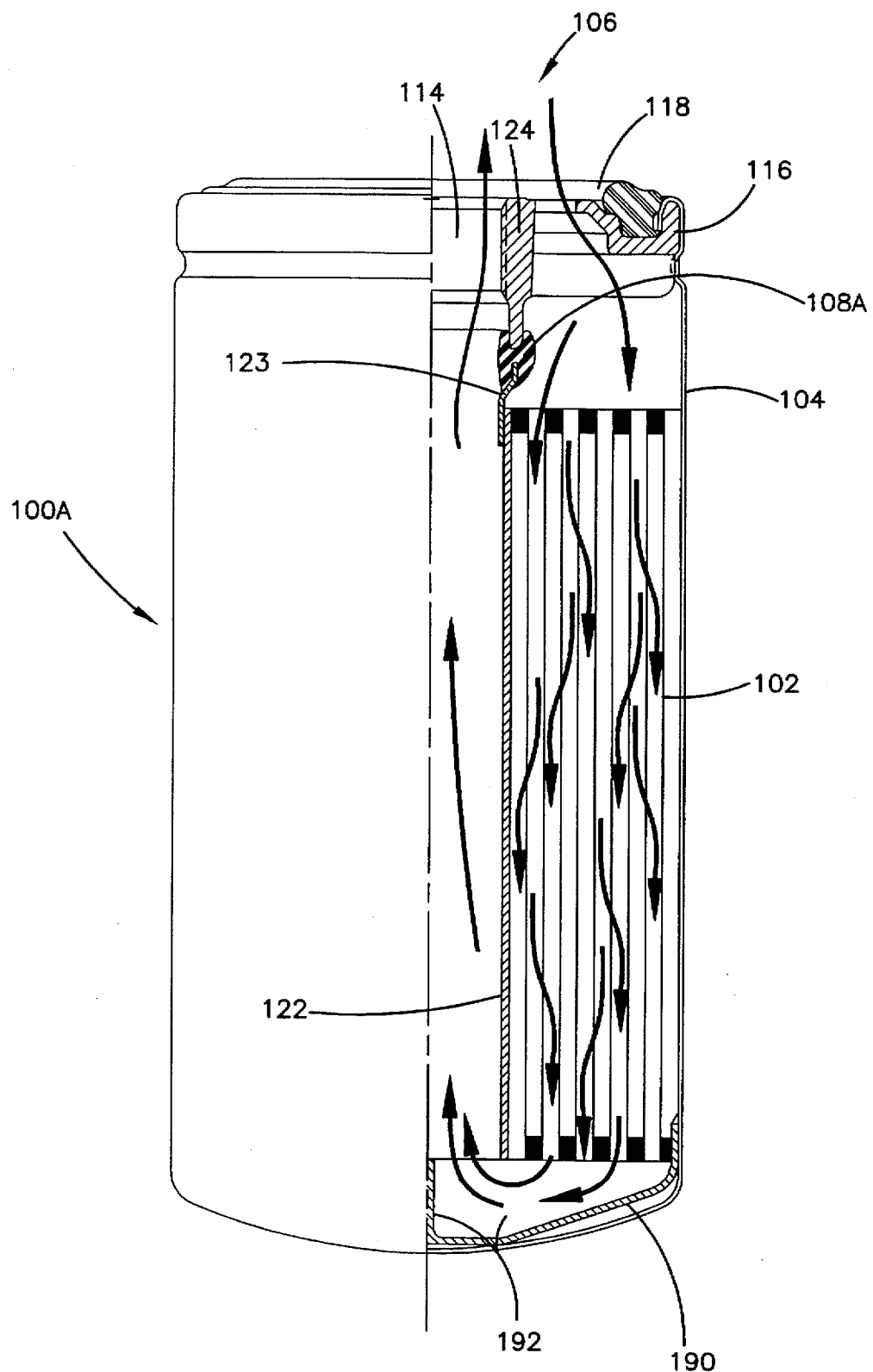
FIG. 20 shows a side sectional view of an alternate embodiment of a filter apparatus according to the present invention.

Referring now to FIG. 20, there is shown another alternate embodiment of the filter apparatus 100A having exterior to interior flow from the open end 106 through the filter element 102A to the closed end. In the embodiment shown, the filter 100A again includes a filter element 102A with the housing 104 and the mounting member 116 having the divider portion 124 and gasket 118 identical to that shown in FIG. 9. A gasket 108A forms a seal between the center annular dividing segment 124 and the extension 123 of the center tube 122. In this manner, flow is directed from the open end 106 through the fluted filter element 102A to the closed end of the filter housing 104. To avoid the need to seal the filter element 102A to the housing 104, and to provide improved flow, an end cap 190 is utilized at the closed end of the filter housing 104. The end cap 190 includes intersecting cross braces 192 providing additional support and is attached to the filter element 102A prior to insertion in the housing 104. Since the end cap 190 is sealed to the exterior of the filter element 102A, there is no need for a seal between the filter element 102A and the housing 104. The end cap 190 has some flex and provides a biasing force to help position the filter element 102A. The fluid flows out the filter element 102A at the closed end to engage the angled portion of the end cap 190 and is directed radially inward to the center tube 122. From there, the liquid flows upward back to the center of the annular center segment 124 and out the filter apparatus 100A. The filter end cap 190 decreases the number of parts and provides proper flow and sealing arrangements as well as support for the filter element 102A.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A filter apparatus, comprising:

a filter housing, comprising a cylindrical portion coaxially surrounding a central axis and having a closed first end and an open second end;

substantially cylindrical fluted filter media including a strip of filter media coaxially wound about said central axis, wherein said strip includes a pervious center fluting sheet of filter media defining a plurality of flutes extending parallel to said central axis, a first pervious facing sheet of filter media disposed on a first side of said fluting sheet for defining a first plurality of axial flute chambers with the first side of said fluting sheet, and a second pervious facing sheet of filter media disposed on a second side of said fluting sheet for defining a second plurality of axial flute chambers with the second side of said fluting sheet, wherein said axial flute chambers extend from a first face of said filter media proximate the first end of the filter housing to a second face proximate the second end of the filter housing, means for sealing one end of said first plurality of axial flute chambers at said first face, wherein the other end of said first plurality of axial flute chambers is open at said second face, and means for sealing one end of said second plurality of axial flute chambers at said second face, wherein the other end of said second plurality of axial flute chambers is open at said second face, and wherein an outermost surface of said filter media defined by one of said first and second pervious facing sheets is radially spaced inwardly from an inner surface of the cylindrical portion of said housing to define an annular flow channel therewith;

means for dividing the second open second end of the filter housing between an inlet portion and an outlet portion, wherein fluid enters through the inlet portion and flows to the open ends of said second plurality of axial flute passages at the first face of the filter media via said annular flow channel and exits through the open ends of said first plurality of axial flute passages at the second face of the filter media and the outlet portion; and positioning means on the first face of the filter media for spacing the first face of said filter media away from the first end of the filter housing and for permitting the fluid to enter open ends of the second plurality of axial flute passages at the first face of the filter media.

2. A filter apparatus according to claim 1, wherein said means for dividing includes a divider forming an inlet in fluid communication to the annular flow channel, wherein fluid flows through the annular flow channel and into the first face of the filter media proximate the closed first end of the filter housing.

3. A filter apparatus according to claim 2, wherein the divider forms a barrier between the channel and the filter media, proximate the open end of the filter housing.

4. A filter apparatus according to claim 2, wherein said divider includes cross braces for supporting the second face of the filter media.

5. A filter apparatus according to claim 1, wherein the pervious fluting sheet of filter media comprises asymmetric flutes.

6. A filter apparatus according to claim 1, wherein the positioning means comprises a biasing element.

7. A filter apparatus according to claim 6, wherein the biasing element comprises a resilient closed plug member at a center portion of the filter media.

8. The filter apparatus according to claim 1, wherein the positioning means extends from a center longitudinal member around which the filter media is formed.

* * * * *